United States Patent [19]

Hansen et al.

[11] Patent Number: 5,460,403
[45] Date of Patent: Oct. 24, 1995

[54] INFLATABLE AIR BAG MODULE

[75] Inventors: Scott L. Hansen, Huntsville; Kurt E. Kottke, Bountiful; Rick L. Halford, Midvale, all of Utah; Makoto Kan, Wako, Japan; Hitoshi Higuchi, Wako, Japan; Iwao Imaizumi, Wako, Japan

[73] Assignees: Morton International, Inc., Chicago, Ill.; Honda Giken Kogyo Kabushiki Kaisha, Tokyo, Japan

[21] Appl. No.: 101,617

[22] Filed: Aug. 3, 1993

[51] Int. Cl.$^6$ ............................................. B60R 21/16
[52] U.S. Cl. ............................................. 280/732
[58] Field of Search ............................ 280/728 A, 728 R, 280/732, 731, 740, 741, 742, 736

[56] References Cited

U.S. PATENT DOCUMENTS

| | | | |
|---|---|---|---|
| 3,618,981 | 11/1971 | Leising | 280/740 |
| 3,895,823 | 7/1975 | Stephenson | 280/740 |
| 4,111,457 | 9/1978 | Kob et al. | 280/728 A |
| 4,167,276 | 9/1979 | Bell et al. | 280/731 |
| 4,810,005 | 3/1989 | Föhl | 280/732 |
| 4,911,471 | 3/1990 | Hirabayashi | 280/732 |
| 5,011,181 | 4/1991 | Laucht et al. | 280/732 |
| 5,069,477 | 12/1991 | Shiraki | 280/732 |
| 5,082,310 | 1/1992 | Bauer | 280/732 |
| 5,125,683 | 6/1992 | Nakajima | 280/731 |
| 5,158,322 | 10/1992 | Sun | 280/732 |
| 5,326,131 | 7/1994 | Yokota et al. | 280/743 R |
| 5,346,248 | 9/1994 | Rhein et al. | 280/728.1 |
| 5,362,096 | 11/1994 | Satoh et al. | 280/732 |

FOREIGN PATENT DOCUMENTS

| | | | |
|---|---|---|---|
| 2335373 | 12/1976 | France. | |
| 5536137 | 3/1980 | Japan. | |
| 2218698 | 11/1989 | United Kingdom. | |
| 2247214 | 2/1992 | United Kingdom | 280/728 A |

*Primary Examiner*—Margaret A. Focarino
*Assistant Examiner*—Paul N. Dickson
*Attorney, Agent, or Firm*—Mason, Kolehmainen, Rathburn & Wyss

[57] ABSTRACT

An inflatable air bag module for motor vehicles includes a housing for containing an air bag in deflated condition and an inflator assembly for providing gas to inflate the air bag when activated. The housing includes a first compartment holding the deflated air bag and having an exposed outer cover on one side formed with a fracture line defining an edge of a door. The door is adapted to pivot open along a hinged area when the cover is fractured by pressure from the inflating air bag as it expands out of the compartment. The housing also includes a second compartment holding the inflator assembly and a generally flat divider panel is provided between the first and second compartments with openings therein for permitting gas from the inflator assembly to rapidly inflate the air bag. A single row or set of fasteners is provided for securing all together the first and second compartments, the divider panel and an open end of said air bag along a common level extending around the entire periphery of the housing at a mid-level. The divider panel helps to prevent the walls of the housing from bulging outwardly when the air bag is inflated.

19 Claims, 5 Drawing Sheets

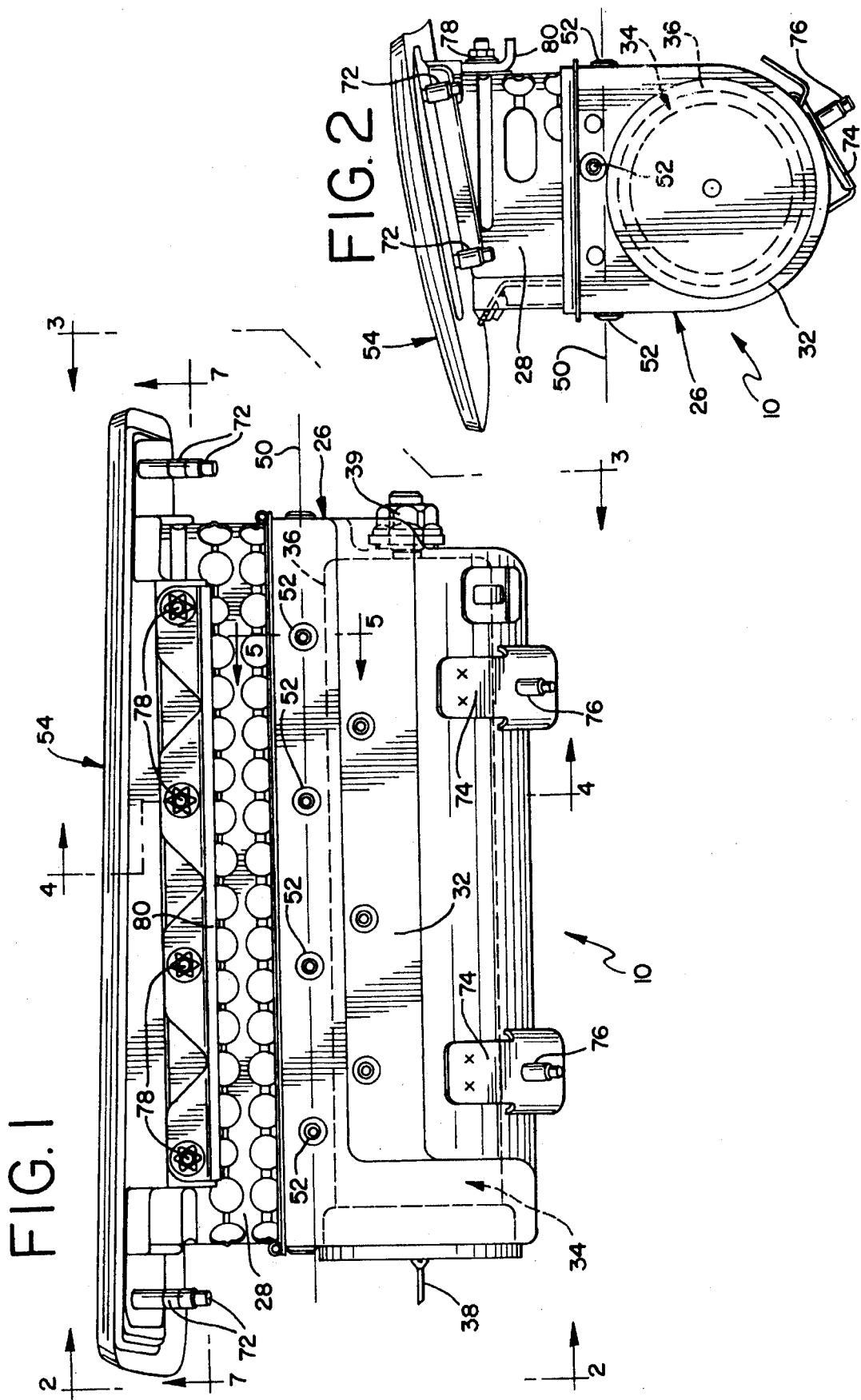

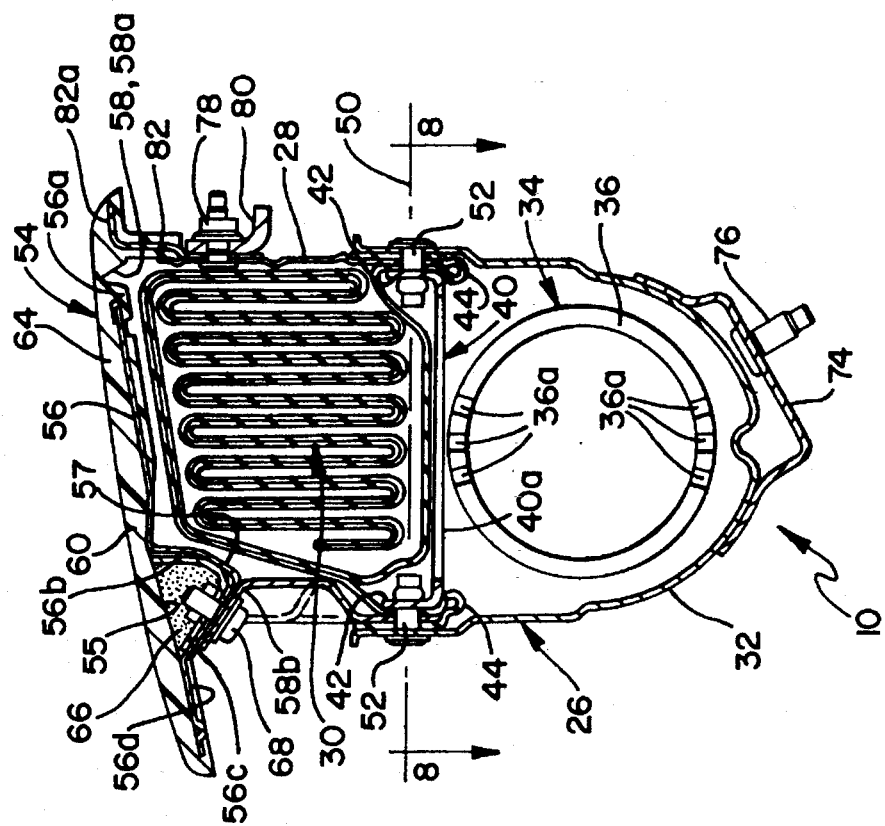

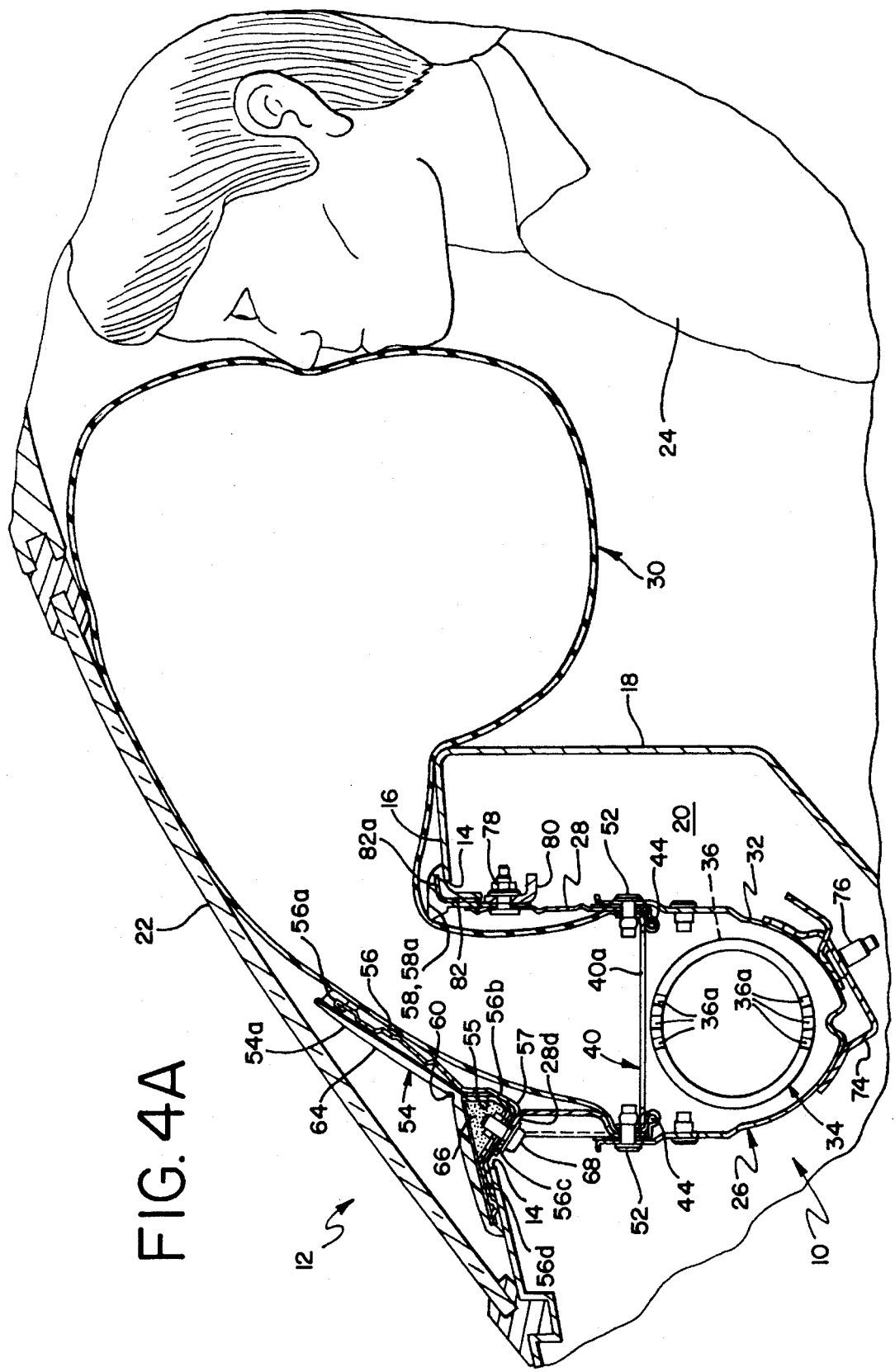

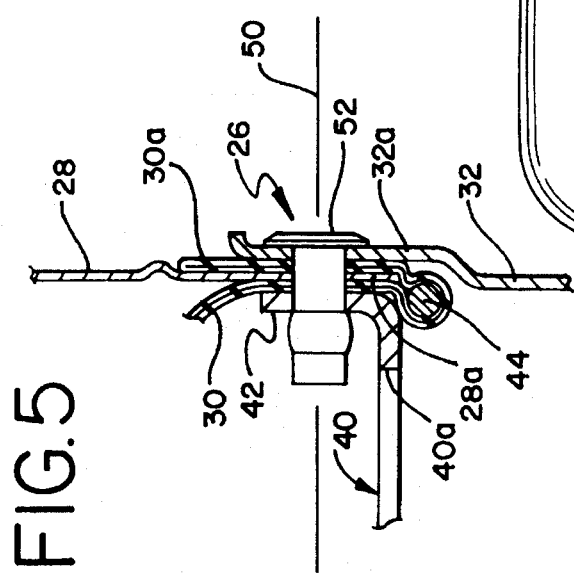
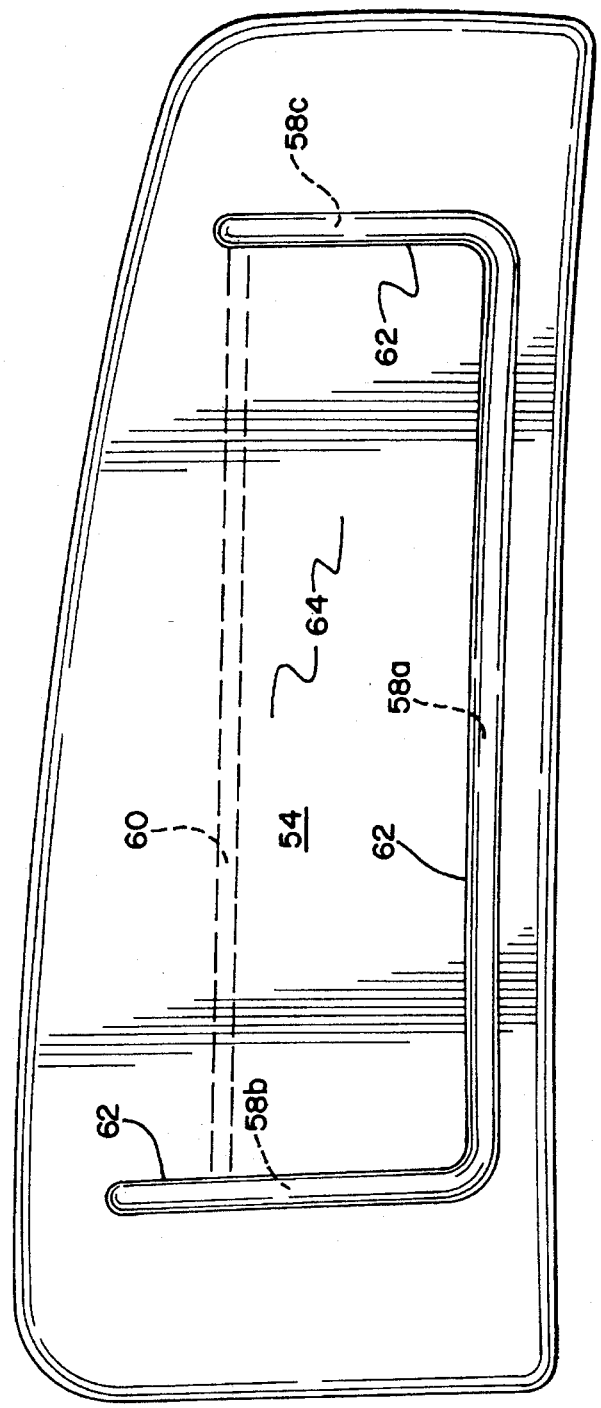
FIG.5
FIG.6

INFLATABLE AIR BAG MODULE

BACKGROUND OF THE INVENTION

1. Field of the Invention

The present invention relates to an inflatable air bag module for use in motor vehicles and more particularly to an air bag module usable on a passenger side of a vehicle and usually mounted behind a dashboard panel of the vehicle for protecting a passenger against injury during a collision. The air bag module of the present invention may include a novel cover for a housing thereof as described more fully in copending U.S. patent application Ser. No. 101,609, filed contemporaneously herewith, issued Jun. 21, 1994 as U.S. Pat. No. 5,322,324 and hereby incorporated by reference.

2. Background of the Prior Art

Prior art inflatable air bag devices have utilized a curved middle retainer for dividing a housing between plural compartments thereof, one compartment containing an air bag and the other compartment containing an inflator assembly. These devices have often required at least two separate sets of fasteners for joining the compartments together with a curved divider panel and an air bag. Generally a curved divider panel separating two compartments of a housing is not as strong as desired especially when relatively large, almost explosive forces, are involved as an air bag is rapidly inflated during deployment.

OBJECTS OF THE INVENTION

It is an object of the present invention to provide a new and improved inflatable air bag module and more particularly a new and improved module of the character described having a substantially flat rather than curved divider panel between a pair of retainer compartments holding a deflated air bag and an inflator assembly, respectively.

Another object of the present invention is to provide a new and improved inflatable air bag module having a strong, lightweight housing including separate first and second compartments separated by a relatively flat divider panel and joined together with a single set of fasteners for providing a strong, easily assembled interconnection between the compartments, the divider panel and the open end of an air bag.

Another object of the present invention is to provide a new and improved inflatable air bag module of the character described which is especially adapted in design for use on a passenger side of a vehicle for protecting a passenger during an automobile accident or the like.

Yet another object of the present invention is to provide a new and improved inflatable air bag module of the character described having major components which can be rapidly assembled together and yet which is extremely strong thus reducing deformation caused by inflatable deployment of an air bag contained in the module.

BRIEF SUMMARY OF THE PRESENT INVENTION

The foregoing and other objects and advantages of the present invention are accomplished in a new and improved inflatable air bag module for use in motor vehicles and the like to protect occupants in a collision. The module includes a housing having a first retainer compartment for holding an air bag in deflated condition and a second retainer compartment for holding an inflator assembly for providing the gas to inflate the air bag when activated. The retainer or first compartment for holding the deflated air bag has an outer cover formed with a fracture line defining an edge of a door. The door has a hinge area or hinge line adapted to permit the door to pivot open rapidly upon fracture of the cover along the fracture line to release the rapidly inflating air bag during expansion out of the retaining compartment. The second compartment is designed to hold an inflator assembly including a gas cylinder and a generally flat divider panel having perforations therein is attached between the first and second compartments. Gas that is discharged from the inflator assembly flows rapidly into the open end of an air bag which is secured to the divider panel and the first and second compartments with a single set of fasteners around a mid-level of the housing. The first and second compartments of the housing are joined together along with a peripheral flange of the perforated divider panel and the open end of the air bag by means of a set of fasteners such as rivets in spaced apart location at a common mid-level area extending around the periphery of the housing between the air bag and the inflator assembly.

BRIEF DESCRIPTION OF THE DRAWINGS

For a better understanding of the present invention, reference should be had to the following detailed description taken in conjunction with the drawings, in which:

FIG. 1 is a front elevational view of a new and improved inflatable air bag module constructed in accordance with the features of the present invention;

FIG. 2 is an end elevational view of the inflatable air bag module looking in the direction of arrows 2—2 of FIG. 1;

FIG. 3 is an opposite end elevational view of the inflatable air bag module looking in the direction of arrows 3—3 of FIG. 1;

FIG. 4 is a transverse cross-sectional view of the inflatable air bag module taken substantially along lines 4—4 of FIG. 1;

FIG. 4A is a transverse cross-sectional view similar to FIG. 4 but illustrating the air bag in inflated deployed condition;

FIG. 5 is an enlarged fragmentary cross-sectional view taken substantially along lines 5—5 of FIG. 1;

FIG. 6 is a top plan view of the inflatable air bag module;

DETAILED DESCRIPTION OF A PREFERRED EMBODIMENT OF THE INVENTION

Figure 7:
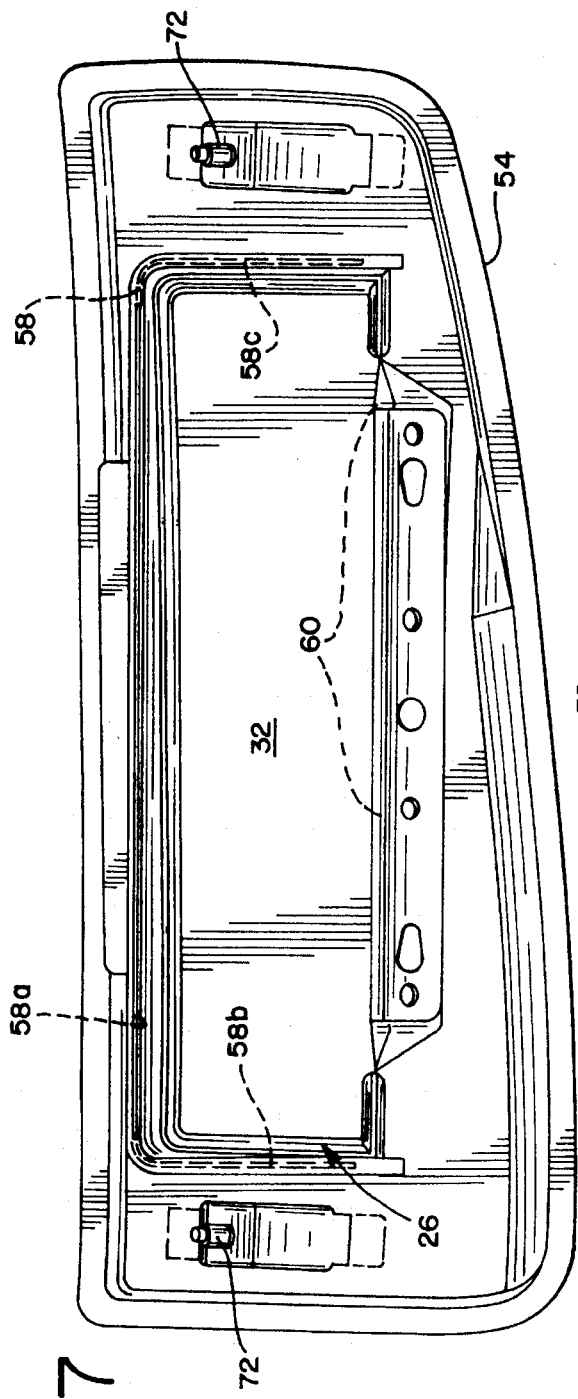
FIG. 7 is a bottom view of a cover for the inflatable air bag module.
Figure 8:
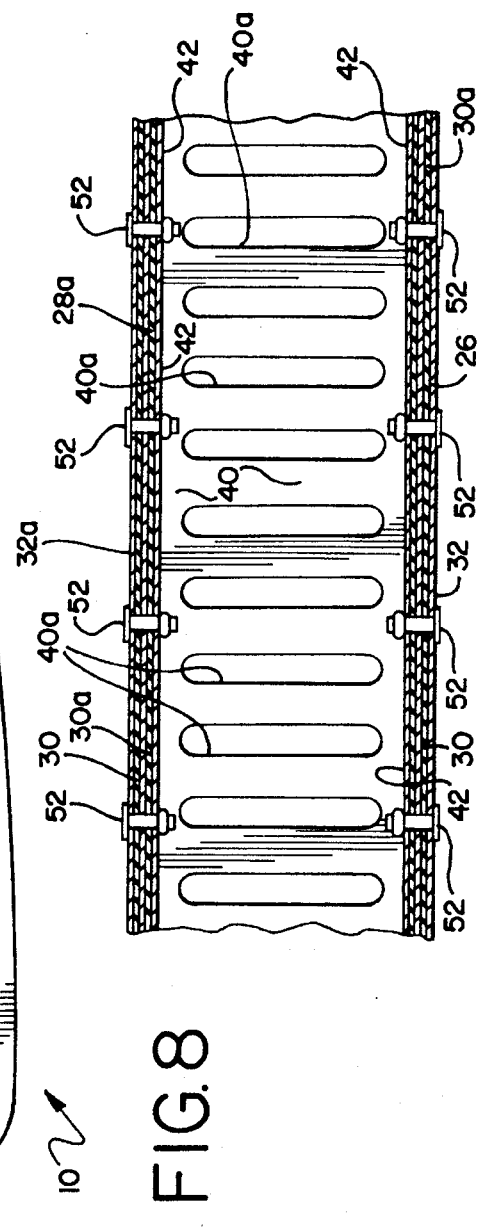
FIG. 8 is a cross-sectional view of the inflatable air bag module taken substantially along lines 8—8 of FIG. 4.

Referring now more particularly to the drawings, therein is illustrated a new and improved inflatable air bag module constructed in accordance with the features of the present invention and referred to generally by the reference numeral 10. The module 10 is especially adapted for use on the passenger side of a vehicle 12 (FIG. 4A) and is adapted to be mounted in an opening 14 of generally rectangular shape formed in a deck 16 extending laterally across the vehicle along the upper edge of the instrument panel or dashboard 18. An enclosed space 20 is formed beneath the generally horizontal deck 16 and forwardly of the instrument panel 18 for containing the module 10 as well as other automotive instruments and wiring harnesses normally provided in the vehicle (not shown). The deck 16 is spaced generally below the windshield 22 in front of a passenger 24 occupying a seat in the vehicle 12.

In accordance with the present invention the modular inflatable air bag module 10 includes a housing 26 of generally rectangular shape having a first or upper air bag retaining compartment 28 formed of metal and adapted to retain and protect an inflatable air bag 30 formed of flexible cloth material. Before deployment, the deflated air bag 30 is completely contained within the first compartment 28 while in a folded-up condition as shown in FIG. 4. The housing 26 also includes a second or lower retaining compartment 32 formed of metal and joined at its upper open end to a lower open end of the upper or first, bag retainer compartment 28.

The lower second retainer compartment 32 is adapted to support and retain an air bag inflator assembly 34 which is activated upon a vehicle crash or accident to supply a volume of gas from a container or cylinder 36 for rapid inflation of the air bag 30 to an expanded condition as shown in FIG. 4A. The cylinder 36 is provided with a plurality of perforations 36a for discharging the expanding gas into the lower compartment 32 to move rapidly upwardly into the lower end of the air bag 30. Activation of the airbag inflator assembly 34, may be accomplished by electrical means through a wiring system indicated generally by the numeral 38 and/or fitting 39 (FIG. 1).

In accordance with an important feature of the present invention, the upper compartment 28 containing the air bag 30 and the lower compartment 32 containing the air bag inflation assembly 34 are separated by means of a divider panel 40. The divider panel is generally flat rather than curved in shape and includes a plurality of relatively large openings or slots 40a for permitting a high volume flow of gas that is discharged from the inflator assembly 34 to rapidly inflate the air bag 30 from the lower open end thereof. The flat, strong, light-in-weight divider panel 40 which extends the full length of the inflator assembly 34 helps prevent any substantial outward deflection or deformation of a middle portion of the opposite side walls of the housing 26 during high pressure bag deployment action. The divider panel 40 includes an upturned peripheral edge flange 42 disposed in sandwiched relationship with an open upper end portion or marginal edge 32a of the compartment 32 and an open lower end portion or marginal edge 28a of the compartment 28 as best shown in FIG. 5. A lower, open end of the air bag 30 is formed with an upturned, marginal edge portion 30a and a circular in cross-section stiffening element 44 is provided below the divider panel 40.

The marginal edge portions 28a, 30a and 32a of the compartments and air bag and the flange 42 of the divider panel 40 are sandwiched tightly together around the entire periphery of the housing 26 at a central or mid level thereof to provide an extremely strong and easy to assemble structure for positively holding the lower end of the air bag 30 in place during rapid inflation thereof when the air inflator assembly 34 is activated. As viewed in enlarged detail in FIG. 5, at a mid-level region 50, the retainer compartments 28 and 32, the lower open end of the air bag 30 and the flange 42 of the divider panel 40 are all joined together to provide an easily assembled, strong structure that is capable of withstanding relatively high pressure forces that are initiated when the air bag is rapidly inflated. Because the divider panel 40 is relatively flat and has a continuous peripheral flange 42 around the edges thereof excellent strength is provided to withstand forces tending to bulge out and permanently deform the walls of the housing 26 around a mid portion thereof. In prior art units having a curved divider panel, the panel would tend to flatten out during air bag deployment, thus permitting the housing walls to bulge outwardly.

In accordance with an important feature of the present invention, four major components of the module 10 comprising the first and second retaining compartments 28, 32, the air bag 30 and the divider panel 40 can all be rapidly and easily joined together at a mid level 50 on the housing 16 (FIGS. 1 and 5) by means of a single set or row of fasteners 52. Pop rivets or the like may be provided at regularly spaced intervals around the entire periphery of the housing 26 providing a strong and sturdy, light-in-weight, yet simple and easily assembled structure that is well able to withstand the forces resulting from high fluid pressures generated when the inflator assembly 34 is activated to deploy the air bag 30.

At the upper end of the housing 26, there is provided a top cover 54 formed of molded plastic such as urethane resin having a generally, rectangular outline as shown in FIGS. 6 and 7. The cover 54 is larger in size than the rectangular outline of the housing 26 or bottom wall of the lower second compartment 32. The top cover 54 includes extended portions at the front, rear and opposite sides which can rest on the upper surface of the deck 16 of the automobile 12 outwardly of the opening 14 in which the module 10 is mounted. The top cover 54 is provided with an internal, embedded in place stiffening element 56 formed of metal and having a free edge 56a (FIGS. 4 and 4A) terminating short of a groove 58 on the undersurface of the cover forming a fracture line comprising a thin wall section formed at the apex of the groove. When the air bag 30 is inflated, the under surface of the top cover 54 is subjected to intense outward pressure which causes the cover to break along the thin wall section above the apex of the groove 58.

The groove 58 is U-shaped in plan view and includes a long portion 58a extending laterally of the vehicle 12 and a pair of relatively short portions 58b and 58c joined to opposite ends of the long portion at right angles thereto. When fracture occurs along the length of the fracture line groove 58, a central door segment 64 is separated away from side and rear outer flange portions of the cover 54 and the door can pivot upwardly in a counterclockwise direction from the closed position of FIG. 4 to an open position 4A. The groove 58 is not visible from the exterior of the cover 54 and is also hidden somewhat by a similarly shaped embossment 62 of a decorative nature as best shown in FIG. 6.

Outer end portions of the grooves 58b and 58c are joined by a hinge area or hinge line 60 extending generally parallel of the groove segment 58a. The U-shaped fracture line and the hinge line 60 define peripheral edges of a smaller door 64 centered within the larger cover 54. The door is free to open up when the panel 54 is severed along the U-shaped groove 58 by pressure from the inflating air bag 30. The panel 54 does not break or fracture along the hinge line 60 however and is secured against severance by the embedded metal stiffening element 56 therein. The metal stiffener 56 includes a main portion 56a within the door 64 and a portion 56b extending angularly downwardly away from the underside of the panel 54 to form a hollow open space or void 55 having a generally triangular shaped transverse cross-section. The stiffening element 56 further includes a re-entrant portion 56c joining a lower edge portion of the segment 56b at an acute angle forming a lower apex 57. The portion 56b extends upwardly from the apex line 57 defining another wall surface of the open space or void 55. The underside of the panel 54 forms a third or top wall surface of the void 55. The segment 56c of the stiffener 56 is integrally joined to a marginal edge portion 56d embedded within a forward portion of the top cover 54 resting on the deck 16.

The void or open space 55 of triangular shaped transverse cross-section extends parallel of the hinge line 60 and is positioned beneath the underside of the cover 54 between upper edges of the stiffener segments 56b and 56c. In accordance with the present invention, the void space 55 is filled with cellular foam material 66 for serving several important purposes. The foam material 66 prevents the entry of unwanted plastic resin into the void 55 during the molding process when the stiffener 56 is molded in place in the panel 54. The foam material 66 provides support from underneath that helps prevent the upper surface of the panel 54 from sagging due to sun and heat in the hinge area 60 above the void space 55.

In order to help insure that the door 64 does not become completely severed from the forwardly extending portion of the top panel 54 as the door pivots to open during bag inflation, the segment 56c of the stiffening element 56 is secured to an angular upper end wall portion 28b of the upper compartment 28 by a plurality of spaced apart rivets or other fasteners 68. Opposite end portions of the top cover 54 are secured to the motor vehicle by pairs of depending fasteners 72 which extend downwardly into openings in suitable brackets (not shown). Similarly, a lower end portion of the lower compartment 32 is provided with brackets 74 and fasteners 76 adapted to extend downwardly into openings in brackets provided on the motor vehicle (not shown) for securing the lower portion of the inflatable air bag module 10 in fixed position in the vehicle within the open space 20 beneath the deck 16 and behind the instrument panel 18. A row of fasteners 78 is provided on a rearwardly facing side wall portion of the upper compartment 28 to secure the same to an angle shaped bracket 80 thereof spaced below a rearward edge portion of the opening 14 in the deck 16 as shown in FIGS. 4 and 4A. Another stiffener 82 of metal is attached to the bracket 80 and has an upper flange 82a embedded in a rearwardly extended portion of the top cover 54 on the deck 16.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An inflatable air bag module for a motor vehicle, comprising:

a housing for containing an air bag in deflated condition and an inflator assembly for providing gas to inflate said air bag when activated;

said housing having spaced apart opposite walls and including a first compartment holding said deflated air bag and having an exposed outer cover on one side formed with a fracture line defining an edge of a door, said door having a hinge area adapted to permit said door to pivot open rapidly upon fracture along said fracture line to release said inflating air bag to expand out of said compartment;

said housing including a second compartment for holding said inflator assembly;

generally flat structural panel means for dividing said housing into said first and second compartments and secured to said opposite housing walls for maintaining existing spacing between said housing walls, said panel means having openings therein for permitting gas from said inflator assembly to rapidly inflate said air bag; and a row of fasteners for securing all together said first and second compartments, said divider panel and said air bag along a common area around a periphery of said module housing.

2. The air bag module of claim 1, wherein;

said first and second compartments having nested confronting open ends; and said row of fasteners extends around said confronting open ends.

3. The air bag module of claim 1, wherein;

said outer cover forms a normally closed end of said first compartment opposite said divider panel means.

4. The air bag module of claim 3, wherein;

said outer cover includes an outer marginal edge portion extending around said door for supporting said housing in said motor vehicle.

5. The air bag module of claim 4, wherein;

said fracture line includes a portion parallel of said hinge area.

6. The air bag module of claim 5, wherein;

said fracture line includes opposite end portions extending between said parallel portion and opposite ends of said hinge area.

7. An inflatable air bag module for a motor vehicle, comprising:

a housing for containing an air bag in deflated condition and an inflator assembly for providing gas to inflate said air bag when activated;

said housing including a first compartment holding said deflated air bag and having an exposed outer cover on one side formed with a fracture line defining an edge of a door, said door having a hinge area adapted to permit said door to pivot open rapidly Upon fracture along said fracture line to release said inflating air bag to expand out of said compartment;

said housing including a second compartment for holding said inflator assembly;

a generally flat divider panel between said first and second compartments having openings therein for permitting gas from said inflator assembly to rapidly inflate said air bag;

a row of fasteners for securing all together said first and second compartments, said divider panel and said air bag along a common area around a periphery of said module housing;

said first and second compartments having nested confronting open ends;

said row of fasteners extending around said confronting open ends; and said divider panel including flange means in nested relation with said confronting open ends of said first and second compartments.

8. The air bag module of claim 7, wherein;

said air bag has an open end in nested relation with said open ends of said first and second compartments and said flange means of said divider panel.

9. The air bag module of claim 8, wherein;

each of said fasteners in said row is extended through said nested open ends of said compartments, said flange means of said divider panel and said open end of said air bag.

10. The air bag module of claim 9, wherein;

said air bag has a closed end opposite said open end positioned adjacent said door for exerting pressure thereon when said air bag is inflated from said open end 11. A housing for an inflatable air bag and an inflator assembly, comprising:

a first compartment for containing said air bag in an uninflated condition, a second compartment for containing said inflator assembly, perforated flat structural panel means for separating said housing into first and second compartments and secured to spaced apart walls of said compartments for preventing said walls from moving farther apart; and joining means for securing said compartments, said panel and said air bag together around a periphery of said housing.

12. The housing of claim 11, wherein:

said air bag has a marginal edge portion secured between said compartments and said panel means.

13. The housing of claim 11, wherein:

said joining means comprises a plurality of spaced apart fasteners aligned along a row extending around a central portion of said housing, each of said fasteners being extended through said compartments, said panel means and said air bag.

14. The housing of claim 11, wherein:

said first compartment includes a wall portion having a thin fracture line outlining an edge of a door adapted to pivot along a hinge line to an open position under pressure from said air bag upon inflation.

15. The housing of claim 14, wherein:

said fracture line has a front portion in spaced parallel relation to said hinge line and a pair of opposite end portions joining said front portion and opposite ends of hinge line.

16. The housing of claim 15, wherein:

said wall portion of said first compartment has a peripheral edge portion around said door adapted to support said housing in place in a vehicle when said air bag is inflated to deploy.

17. A housing for an inflatable air bag and an inflator assembly, comprising:

a first compartment for containing said air bag in an uninflated condition, a second compartment for containing said inflator assembly, a perforated flat panel separating said first and second compartments;

joining means for securing said compartments, said panel and said air bag together around a periphery of said housing;

said joining means comprising a plurality of spaced apart fasteners aligned along a row extending around a central portion of said housing, each of said fasteners being extended through said compartments, said panel and said air bag; and said joining means comprising overlapping marginal edge portions of said first and second compartments, a flange of said panel and a marginal edge portion of said air bag.

18. The housing of claim 17, wherein:

said fasteners comprise rivet means secured in place from outside said housing after said marginal edge portions and said flange are positioned in overlapping relation.

19. A housing for an inflatable air bag and an inflator assembly, comprising:

a first compartment for containing said air bag in an uninflated condition, a second compartment for containing said inflator assembly, a perforated flat panel separating said first and second compartments;

joining means for securing said compartments, said panel and said air bag together around a periphery of said housing;

said first and second compartments having nested confronting open ends, and said panel being disposed between said open ends; and said panel having flange means in nested overlapping relationship with said confronting open ends of said compartments.

* * * * *